I. FLANDERS.
Stump-Extractors.
No. 141,341.  Patented July 29, 1873.
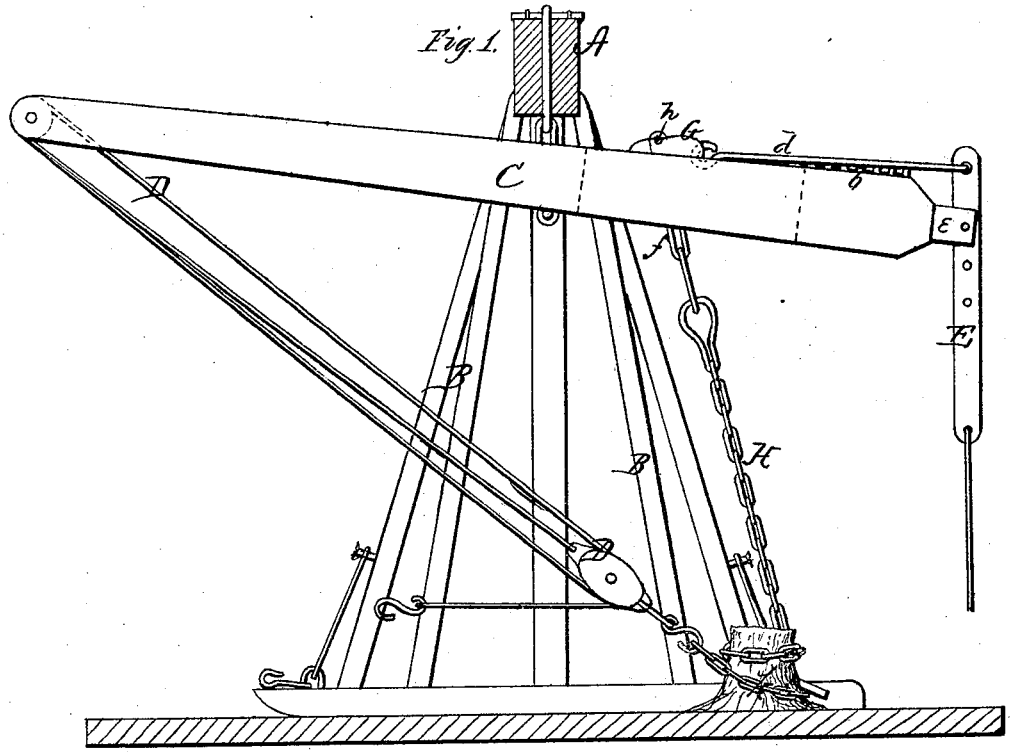
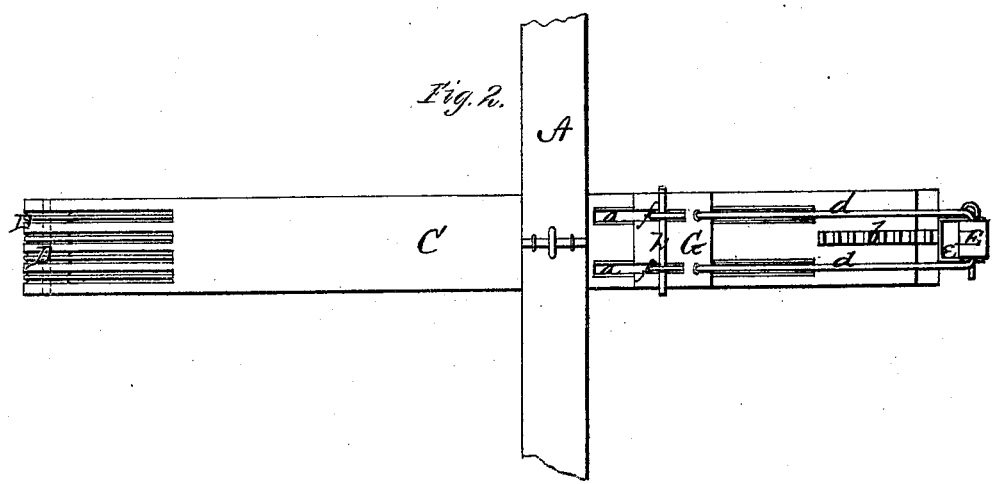

UNITED STATES PATENT OFFICE.

IRA FLANDERS, OF PAW PAW, MICHIGAN.

IMPROVEMENT IN STUMP-EXTRACTORS.

Specification forming part of Letters Patent No. 141,341, dated July 29, 1873; application filed July 5, 1873.

*To all whom it may concern:*

Be it known that I, IRA FLANDERS, of Paw Paw, in the county of Van Buren and State of Michigan, have invented certain new and useful Improvements in Stump-Extractors; and I do hereby declare that the following is a full, clear, and exact description thereof, reference being had to the accompanying drawings and to the letters of reference marked thereon which form a part of this specification.

The nature of my invention consists in the construction and arrangement of a stump-extractor, as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a plan view of my stump-extractor.

A represents a top beam supported at each end by a frame, B, which is to be staked, or otherwise suitably fastened, to the ground. Under the beam A is suspended a lever, C, at one end of which are arranged one or two tackles, D, as shown. The other end of the lever C has two longitudinal slots, a a, running parallel with each other. This end of the lever is also provided with a rack-bar, b, and at the end are two ears, e e, between which a short lever, E, is pivoted. The upper end of this lever is, by rods d d, connected with a bearing-block, G, which rests upon the main lever C, and has two slots from the inner end corresponding with the slots a in the lever. Through these slots are passed two links, f f, supported by a pin or bar, h, which passes through them, and is laid in a groove on the upper surface of the block G. To the lower ends of the links f f are, by suitable means, attached the ends of a chain, H. This chain goes down under the root of the stump and then up to the links.

A short chain, k, is passed around the stump, and to this chain the tackles D D are hooked. The teams, one to each tackle, are then started, which breaks the stump loose. The teams will then back up and the slack of the chain is taken up from either end, and so on, till the stump is out.

The chain may be used single by attaching a V-shaped hook to the link. The chain is passed around the stump with a half hitch, and the other end of the chain attached to the hook mentioned.

When using the double chain it may be passed around the stump, and a common round link is then passed over the two ends of the chain and moved down on the same, which forms the hitch.

The two rods d d which connect the lever E with the block G are themselves connected by short rods or bars i i, which drop in between the teeth of the rack-bar b on the lever C.

By the use of the lever E the position of the bearing-block G can readily be changed at will to regulate the power as required, and the block is held in any position by the rods i and rack-bar b.

Having thus fully described my invention, what I claim as new, and desire to secure by Letters Patent, is—

1. The combination, with the lever of a stump-extractor, of the rack-bar b, lever E, rods d d with cross-bars i i, and the bearing-block G, all substantially as and for the purposes herein set forth.

2. The combination of the beam A, frames B, lever C, tackles D, rack-bar b, lever E, rods d i, block G, links f, and chain H, all substantially as and for the purposes herein set forth.

In testimony that I claim the foregoing as my own, I affix my signature in presence of two witnesses.

IRA FLANDERS.

Witnesses:
CHARLES E. GALLIGAN,
C. P. GALLIGAN.